US010807920B2

(12) United States Patent
Wu et al.

(10) Patent No.: US 10,807,920 B2
(45) Date of Patent: Oct. 20, 2020

(54) TRICHODERMA-DERIVED SELENIUM NANOPARTICLES FOLIAR FERTILIZER FOR REDUCING CROP FUNGAL DISEASES AND TOXIN CONTAMINATION

(71) Applicant: Shanghai Institutes for Biological Sciences, Chinese Academy of Sciences, Shanghai (CN)

(72) Inventors: Aibo Wu, Shanghai (CN); Dongqiang Hu, Shanghai (CN); Na Liu, Shanghai (CN); Song Yu, Shanghai (CN); Dianzhen Yu, Shanghai (CN); Yan Tang, Shanghai (CN); Yuling Wang, Shanghai (CN)

(73) Assignee: Shanghai Institute of Nutrition and Health, Academy of Sciences, Shanghai (CN)

( * ) Notice: Subject to any disclaimer, the term of this patent is extended or adjusted under 35 U.S.C. 154(b) by 0 days.

(21) Appl. No.: 16/751,773

(22) Filed: Jan. 24, 2020

(65) Prior Publication Data

US 2020/0277240 A1 Sep. 3, 2020

(30) Foreign Application Priority Data

Jan. 28, 2019 (CN) .......................... 2019 1 0080663

(51) Int. Cl.
| | |
|---|---|
| *C05F 17/20* | (2020.01) |
| *C05G 5/12* | (2020.01) |
| *C05F 17/10* | (2020.01) |
| *A01N 63/38* | (2020.01) |

(52) U.S. Cl.
CPC ............ *C05F 17/20* (2020.01); *C05F 17/10* (2020.01); *C05G 5/12* (2020.02); *A01N 63/38* (2020.01)

(58) Field of Classification Search
CPC . C05F 17/20; C05F 17/10; C05G 5/12; A01N 63/38
See application file for complete search history.

(56) References Cited

FOREIGN PATENT DOCUMENTS

| CN | 103724064 A | * | 4/2014 |
|---|---|---|---|
| CN | 105294251 A | * | 2/2016 |

OTHER PUBLICATIONS

Kim, Jun Young, et al. "Identification and characterization of Trichoderma species damaging shiitake mushroom bed-logs infested by Camptomyia pest." J Microbiol Biotechnol 26.5 (2016): 909-917.*
Mycrobe. "Potato Dextrose Agar (PDA)" (/blog/2018/7/6/potatodextrose-agar-pda) Jul. 7, 2018.*

\* cited by examiner

*Primary Examiner* — Jennifer A Smith
(74) *Attorney, Agent, or Firm* — Banner & Witcoff, Ltd.

(57) ABSTRACT

The present invention relates to a *Trichoderma*-derived selenium nanoparticles foliar fertilizer which reduces crop fungal diseases and toxin contamination. For the first time, a new type of agricultural composition was disclosed, which is mainly obtained by mixing *Trichoderma harzianum* culture with selenite, which has a good fungistatic effect. The inventors also screened and obtained a *harzianum* strain with excellent effect. After fermentation, mixed with selenite and post-processed, the obtained product had a significant effect on resisting harmful fungus and improving disease resistance of the plant.

19 Claims, 3 Drawing Sheets
Specification includes a Sequence Listing.

TRICHODERMA-DERIVED SELENIUM NANOPARTICLES FOLIAR FERTILIZER FOR REDUCING CROP FUNGAL DISEASES AND TOXIN CONTAMINATION

RELATED APPLICATION DATA

This application is a Paris Convention Application under 35 U.S.C. 119 of Chinese application number 201910080663.1 filed Jan. 28, 2019; which is hereby incorporated by reference in its entirety.

FIELD OF THE INVENTION

The present invention relates to agricultural fertilizers; more particularly, the present invention relates to a *Trichoderma*-derived selenium nanoparticles foliar fertilizer that reduces crop fungal diseases and toxin contamination.

BACKGROUND OF THE INVENTION

Selenium is an indispensable trace mineral that plays a very important biological and immunological role in the human body. In China, the method of spraying selenium on crops to increase the selenium level of staple crops has been used to prevent selenium deficiency such as Keshan disease and Kashin-Beck disease, and has achieved certain effects. Plant selenium has higher bioavailability than animal selenium products, and organic selenium is safer and more effective than inorganic selenium. Whether selenium comes from the natural selenium-rich area or is administered by selenium fertilizer does not make the bioavailability of plant selenium different. In selenium-deficient areas, applying selenium fertilizer to soil or crops to increase the selenium content in the staple food is one fundamental measure to improve selenium nutrition deficiency in the human body.

Fungal diseases seriously threaten the yield and quality of crops, among which scab and stem rot in food crops caused by *Fusarium* infection are particularly serious. Economic crops are likely to cause black spot disease and black rot disease after infection with *Alternaria* spp. These two types of fungal diseases have caused significant losses to the domestic crop economy and have shaken the national foundation.

In the process of fungal diseases, secondary metabolites secreted along with the growth of fungi, that is, the mycotoxins, already bring many hidden troubles to human health. Fumonisins produced by *Fusarium beadium* is a class 2B carcinogen. In mammalian experiments, FB1 can cause various specific toxicological effects. A series of epidemiological studies have shown that FB1 is associated with the onset of human esophageal cancer. *Alternaria* toxins are a class of small molecules that have synergistic toxicity with each other. TeA can complex the metal ions of the active center of the protein. AOH affects the activity of DNA topoisomerase. Together, both of them can easily cause acute poisoning in mammals.

At present, although there are many selenium-rich foliar fertilizers in the market, most selenium fertilizers are obtained by adding chemical selenium salts or tin ore to ordinary fertilizers. Although these selenium salts or selenium-rich ore are easy to obtain, they are toxic and have great safety risks. Moreover, such fertilizers are currently difficult to be absorbed by plants, and are easily washed into the soil by rain to cause secondary contamination. At the same time, selenite, as a raw material for the production of selenium fertilizer, is toxic itself, and good reaction conditions are required to completely eliminate the toxicity.

Therefore, under the premise of not destroying the environment, it is particularly important to develop new multifunctional fertilizers to reduce crop fungal diseases and improve crop quality.

SUMMARY OF THE INVENTION

The purpose of the present invention is to provide a *Trichoderma*-derived selenium nanoparticles foliar fertilizer which reduces crop fungal diseases and toxin contamination.

In a first aspect of the present invention, there is provided an agriculture composition, which is prepared by a method comprising the steps of: mixing a *Trichoderma harzianum* culture with selenite.

In another aspect of the present invention, there is provided a method for preparing an agriculture composition, comprising: (1) fermenting strain *Trichoderma harzianum* to obtain a *Trichoderma harzianum* culture; and (2) mixing a selenite with the *Trichoderma harzianum* culture from (1).

In a preferred example, the strain *Trichoderma harzianum* is strain CCTCC NO: M 2019066 deposited in the China Type Culture Collection Center.

In another preferred example, the selenite includes (but is not limited to): sodium selenite, potassium selenite, and zinc selenite.

In another preferred example, the *Trichoderma harzianum* culture is: the *Trichoderma* metabolite isolated from the fermentation of strain *Trichoderma harzianum*; preferably, the culture supernatant isolated from the fermentation of strain *Trichoderma harzianum*.

In another preferred example, the fermentation medium contains potato flour and glucose; preferably, the medium includes: 10-22 parts by weight of potato flour, 1-2.2 parts by weight of glucose, 0.0015-0.004 parts by weight of selenite, 0.004-0.015 parts by weight of ascorbic acid, 0.0001 parts by weight of strain *Trichoderma harzianum*, and the balance of water; preferably, 75-85 parts by weight of water (preferably purified water).

In another preferred example, the fermentation medium comprises 12-20 parts by weight of potato flour, 1.2-2 parts by weight of glucose, 0.002-0.003 parts by weight of selenite, 0.006-0.01 parts by weight of ascorbic acid, 0.0001 parts by weight of strain *Trichoderma harzianum*, and the balance of water.

In another preferred example, the fermentation process includes:

(a) dissolving the potato flour in water, heating to boil, and filtering to obtain the filtrate;

(b) dissolving glucose in the filtrate of step (a), mixing and sterilizing to obtain a culture medium;

(c) inoculating *Trichoderma harzianum* in the culture medium of (b), incubating with shaking at room temperature (preferably 25±2° C.; more preferably 25±1° C.) for 5±3 days (preferably 5±2 Days; more preferably 5±1 days), to obtain a culture solution;

(d) filtering and centrifuging the culture solution of (c) to obtain a supernatant.

In another preferred example, the inoculation amount of the strain is 0.05% to 0.15%; preferably 0.08% to 0.12%.

In another preferred example, the method further comprises: adding a reducing agent to the mixture after the *Trichoderma harzianum* culture is mixed with the selenite; and centrifuging to obtain a precipitate.

In another preferred example, the reducing agent includes: ascorbic acid or sodium citrate.

In another preferred example, the composition is a pesticide composition; preferably, the pesticide composition is a pesticide composition comprising the reaction product of the *Trichoderma harzianum* culture and the selenite as the main active components. More preferably, the pesticide composition is a pesticide composition comprising the reaction product of the *Trichoderma harzianum* culture, the selenite and the reducing agent (a chemical reducing agent) as main active components.

In another aspect of the present invention, there is provided a use of the composition in the preparation of fertilizers for reducing crop fungal diseases and toxin contamination.

In another aspect of the present invention, there is provided a *Trichoderma*-derived selenium nanoparticles foliar fertilizer, which comprises the composition and an agriculturally (including the field of fertilizers or pesticides) acceptable carrier.

In another aspect of the present invention, there is provided a strain *Trichoderma* having a deposit number of CCTCC NO: M 2019066 at the China Type Culture Collection.

In another aspect of the present invention, there is provided a *Trichoderma* culture produced by the strain *Trichoderma* having a deposit number of CCTCC NO: M 2019066 at the China Type Culture Collection.

In another aspect of the present invention, there is provided a use of the *Trichoderma* strain or the *Trichoderma* culture for the preparation of a fertilizer for reducing the fungal disease and toxin contamination of crops.

In another aspect of the present invention, there is provided a kit for agriculture, comprising the composition, or the *Trichoderma*-derived selenium nanoparticles foliar fertilizer, or the strain *Trichoderma*, or the *Trichoderma* culture according to any one of the foregoing.

Other aspects of the invention will be apparent to those skilled in the art from the disclosure herein.

DETAILED DESCRIPTION OF THE INVENTION

Figure 1:
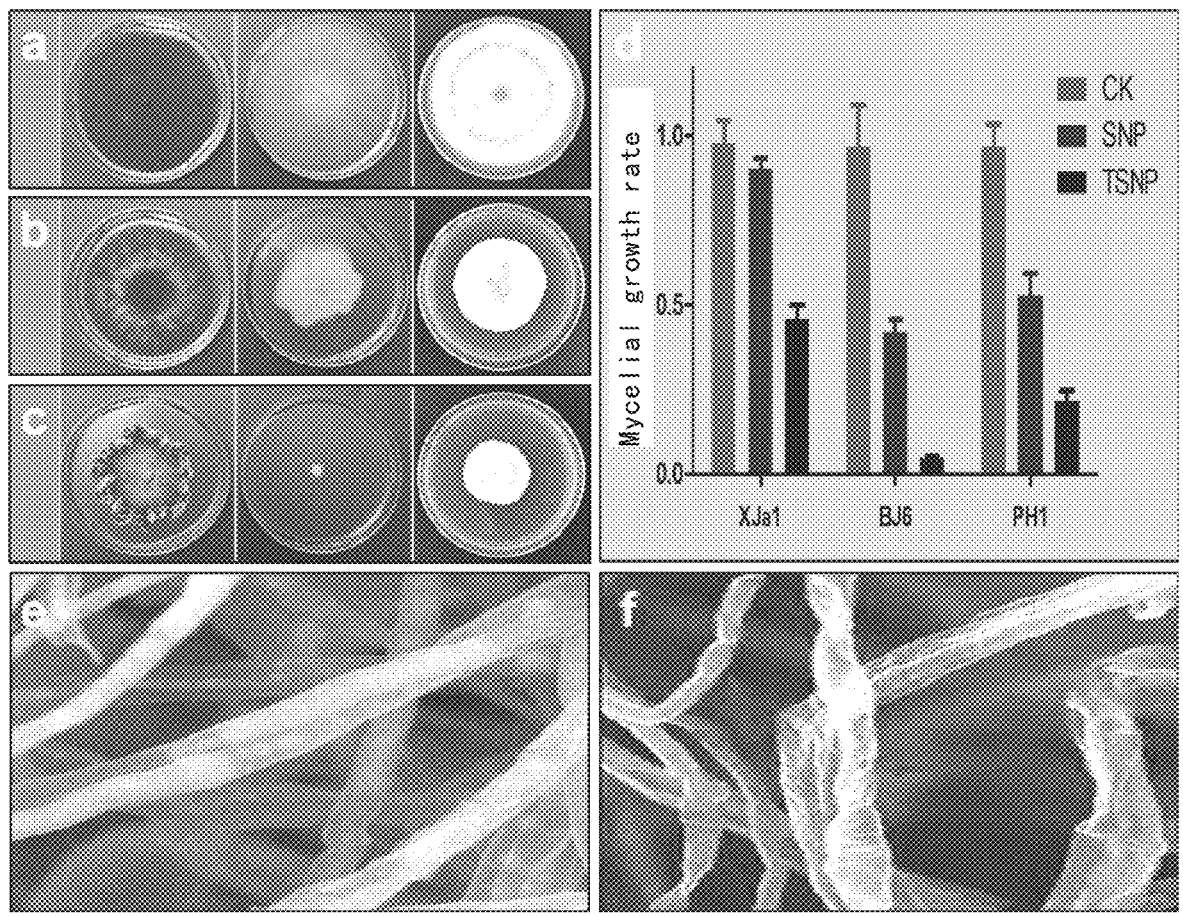
FIG. 1. *Trichoderma*-derived selenium nanoparticles (TSNP) inhibits mycelium better than traditional selenium nanoparticles (SNP);
(a) Control group, PDA medium;
(b) PDA medium added with 200 μg/ml SNP;
(c) PDA medium added with 200 μg/ml TSNP;
(d) the mycelial growth rate of the three strains;
(e) scanning electron micrography image of normal mycelium after 10 days of culture;
(f) scanning electron microscopy image of deformed normal mycelia after TSNP treatment for 10 days.

After intensive research, the inventors revealed for the first time a new type of agriculturally applicable composition, which is mainly obtained by mixing *Trichoderma harzianum* culture with selenite, which has a good fungicidal effect. The inventors also screened and obtained a novel strain with very good effect, wherein the product obtained after mixing the fermentation culture of the stain with selenite has a significant effect on resisting harmful fungi and improving plant disease resistance.

Based on the new findings of the present invention, a method for preparing an agriculture composition is provided, comprising: (1) fermenting stain *Trichoderma* to obtain a *Trichoderma* culture; and (2) mixing a selenite with the *Trichoderma* culture from (1). In a preferred embodiment of the present invention, a reducing agent is further added to the mixture to promote more complete conversion of selenite.

*Trichoderma* is a relatively environmentally friendly strain in filamentous fungi. Compared with other filamentous fungi, *Trichoderma* does not have a pathogenic type, does not produce mycotoxins, and is only parasitic on decaying dead wood or spread in the air. Studies on part of *Trichoderma* showed that it has antagonistic functions, and some *Trichoderma* and pathogenic fungi have a certain effect on inhibiting the growth of pathogenic bacteria when co-cultivated. However, its ability to inhibit the growth of pathogenic fungi is limited and its stability is not ideal. It is also difficult to develop products with application value.

In the technical solution of the present invention, *Trichoderma* is used as an antagonistic fungus, and its metabolites in the culture medium can prevent and control pathogenic fungi, and help crops effectively avoid fungal infestation. At the same time, selenium nanoparticles itself act as a fungal antagonist and help plants fight harmful fungal diseases by the synergetic effect with *Trichoderma* metabolites. In addition, selenium is the active center of key enzymes in various enzyme activities. Nano-sized selenium can effectively enter the plant body. The absorbed selenium element participates in the synthesis of various physiological and biochemical reactions in the plant body, and activating the crop's own growth potential and disease resistance.

The present invention identifies an ideal strain of *Trichoderma harzianum*. Therefore, as a preferred embodiment of the present invention, the *Trichoderma* is a strain with the CCTCC NO: M 2019066 deposit number in the China Type Culture Collection. The culture product of this strain is obtained after mixing with selenite, which has a good fungal inhibitory effect, and has good stability.

As a preferred embodiment of the present invention, the selenite includes, but is not limited to, sodium selenite, potassium selenite, and zinc selenite. Preferably it is sodium selenite.

As a preferred embodiment of the present invention, the *Trichoderma* culture product is: the *Trichoderma* metabolite isolated from the fermentation of *Trichoderma harzianum*; preferably, the supernatant isolated from the fermentation of *Trichoderma harzianum*. The present inventors have discovered that the reaction of the culture supernatant with selenite can reduce the selenite to elemental selenium modified by *Trichoderma*-derived organic matter, thereby facilitating its conversion into organic selenium which can be easily absorbed by plants, and organic selenium is easier to absorb than inorganic selenium.

As a preferred mode of the present invention, the culture medium for fermentation culture contains potato flour and glucose; preferably, the culture medium includes: 10-22 parts by weight of potato flour, 1-2.2 parts by weight of glucose, 0.0015-0.004 parts by weight of selenite, 0.004-0.015 parts by weight of ascorbic acid, 0.0001 parts by weight of strain *Trichoderma*, and the balance of water; preferably, 75-85 parts by weight of water. Preferably, purified water is used. In a preferred embodiment, the inoculation amount of the strain *Trichoderma* is 0.05% to 0.15%; preferably 0.08% to 0.12%.

As a preferred mode of the present invention, the method further comprises: adding a reducing agent to the mixture after the *Trichoderma* culture is mixed with selenite; and centrifuging to obtain a precipitate. Together with the *Trichoderma* culture, the reducing agent is beneficial for the conversion of selenite into organic selenium which can be easily absorbed by plants. As the raw material for the production of selenium fertilizer, selenite is toxic by itself. The reaction conditions established by the present invention can completely eliminate its toxicity.

The reducing agent may include: ascorbic acid and sodium citrate, and the like. In addition, other agents capable of promoting the reduction reaction of selenite can also be used in the present invention. A preferred reducing agent is ascorbic acid.

The aforementioned composition can be used as a *Trichoderma*-derived selenium nanoparticles foliar fertilizer; alternatively, it can be further mixed with an agriculturally acceptable carrier or excipient to prepare a *Trichoderma*-derived selenium nanoparticles foliar fertilizer. The fertilizer reduces crop fungal diseases and toxin contamination.

Therefore, the present invention also provides a *Trichoderma*-derived selenium nanoparticles foliar fertilizer, which comprises an effective amount of the aforementioned composition and an agriculturally (including the field of fertilizers or pesticides) acceptable carrier.

In the present invention, the term "comprising" means that various ingredients can be used together in the mixture or composition of the present invention. Thus, the terms "consisting essentially of" and "consisting of" are included in the term "comprising".

In the present invention, the term "agriculturally acceptable" ingredients are materials suitable for agricultural use and not having excessively adverse side effects (such as toxicity, irritation and allergy) on humans or other animals and plants, that is, having reasonable benefit/risk ratio.

In the present invention, the term "an agriculturally acceptable carrier" is an acceptable solvent, suspending agent, excipient, or the like for delivering the composition or foliar fertilizer of the present invention to plants. The carrier can be a liquid or a solid.

The dosage form of the composition can be various, including but not limited to: lyophilizer, wettable powder, emulsifiable concentrate, aqueous solution, emulsion, sprayable solution, oily or aqueous dispersion, suspension, powder, granules, or microcapsules. It should be understood that any dosage form that can deliver the composition or foliar fertilizer according to the present invention to a plant (such as a leaf or stem) or seed under the premise of maintaining all or part of its activity is desirable. Preferred are those easily deliverable forms, such as solutions, liquid sprays, or sprays.

In the present invention, the agriculturally acceptable carrier may further include an auxiliary agent. The auxiliary agent is an auxiliary component that plays an assistant regulating function in the composition. For example, the auxiliary agent may be a surfactant, an adhesion or other types of auxiliary agents.

The principles of the preparation of various formulations are known and described, for example, in the following literature: Winnacker-Kuchler, "Chemische Technologie" chemical technology, Vol. 7, C. Hauser Verlag Munich, 4th edition, 1986; van Valkenburg "Pesticide Dosage Forms", Marcel Dekker NY, 2nd edition, 1972-73; K. Martens, "Spray Drying Manual", 3rd edition, G Goodwin Ltd. London.

The auxiliary agents required for the present composition (e.g., inert substances, surfactants, solvents, and other additives) are also known, and are described in, for example: Watkins "Handbook of Insecticide Diluents and Carriers" Section 2nd Edition, Darland Books, Caldwell N.J.; HvOlphen, "Guide to Clay Colloid Chemistry" 2nd Edition, J. Wiley & Sons, NY, Marsden, "Solvent Guide" 2nd Edition, Interscience, N Y 1950; McCutcheons, "Except Annuals of Scale and Emulsifiers", MC Publ. Corp., Ridgewood N.J.; Sisley and Wood, "Surface Encyclopedia", Chem. Publ. Co. Inc., NY1964; Schonfelt," Grenzflachenaktive Athylenoxidaddukte "Surface Active Loop Oxane addition products, Wiss. Verlagsgesell., Stuttgart 1976; Winnacker-Kuchler, "Chemische Technologie" chemical technology, Vol. 7, C. Hauser Verlag Munich, 4th edition, 1986.

When used, the fertilizer of the present invention can be used during crop flowering and fruiting period; it can also be used as a base fertilizer and be top dressed again during flowering and fruiting period.

The *Trichoderma* strain of the present invention is named JF301, and its deposit number is CCTCC NO: M 2019066 in the China Type Culture Collection Center. The present inventors isolated strains of interest from various types of plants and studied their effects. Finally, the *Trichoderma* strain was isolated from a humus sample such as a shiitake mushroom. The *Trichoderma* strain or a culture thereof can also be contained in a kit for application in the production of foliar fertilizer of the present invention.

The composition of the present invention, the *Trichoderma*-derived selenium nanoparticles foliar fertilizer containing the composition and an agriculturally acceptable carrier can also be contained in a kit for application in production or agricultural applications.

The beneficial effects of the present invention include that the present invention selects the metabolite of the antagonistic strain *Trichoderma* as a stabilizer and modifier for the synthesis of selenium nanoparticles. On the one hand, it does not need the addition of an additional dispersion stabilizer to reduce the cost, and directly convert inorganic selenium into organic selenium that can be easily absorbed by plants. On the other hand, as an antagonistic fungus for prevention and control, the metabolites of *Trichoderma* effectively inhibit the growth of pathogenic filamentous fungi, reduce crop diseases, and reduce the higher risk of mycotoxins in food product. At the same time, nano-scale foliar fertilizer enhances plant absorption, avoids secondary contamination caused by selenium flowing into the soil, and the conversion of selenite reduces the risk of soil compaction.

The technical solution of the present invention will be described in detail and completely below. The following description is merely exemplary and does not limit the implementation object. Based on the examples in the present invention, other persons skilled in the art, under the premise of not making creative results, other examples obtained based on the present invention, all belong to the protection scope of the present invention.

In the following examples, unless otherwise specified, the amounts of raw materials used are all parts by weight, and the contents of each raw material are all parts by weight. Unless defined otherwise, all technical and scientific terms used herein have the same meaning as commonly understood by one of ordinary skill in the art to which this invention belongs.

EXAMPLES

Example 1. *Trichoderma harzianum* JF309 Strain

1. Identification of the Strain

In the edible shiitake mushroom planting base, those areas with good growth of shiitake mushrooms were counted. When the harvest was completed, a few soil samples were taken from the periphery of the shiitake mushroom roots in these specific areas and brought back to the laboratory for fungal separation. Ampicillin antibiotics were added to the fungal medium, and the soil suspension diluted 1000 times (volume/mass) was evenly coated on the surface of the medium. After 4 days, through visual identification, a group of fungi with the highest abundance in the soil flora was found, picked up with a pipette tip, and transferred to a plate for separate culture.

This type of fungus produced a large number of white transparent hyphae in the first 2 to 3 days of culture, and quickly filled the plate. The colony center was light green. About 1 week later in the culture, the colony center became greener, with white spots appeared. The marginal hyphae were greenish, and large amount of green powdery contents were secreted, which produces a unique volatile scent. The marginal mycelium was picked, the fungal ITS PCR strain identification was performed, and the comparison was performed after sequencing. The results showed that the fungus belonged to *Trichoderma harzianum*.

2. The Ability of JF309 Strain on the Inhibition of Pathogenic Bacteria

In this embodiment, the inventors performed two types of fungus confrontation experiments on a solid plate. The two types of strains were *Trichoderma* and *Alternaria*. The black fungus bodies are two strains of *Alternaria* spp. (*Alternaria sclerotiorum* (upper), and *Alternaria* spp. (Below)), and the green fungi are eight different strains of *Trichoderma*, among which E7 and F7 are *Trichoderma harzianum* JF309.

The culture conditions were 26° C. and one week in the dark. A 1 cm diameter fungus block was picked from the plate of the activated fresh strain and inoculated into a fresh blank medium. The two types of fungi were picked at the same time, and the fungi were inoculated with the fungi face down, with two fungi blocks at a distance of 5 cm from each other.

Figure 6:
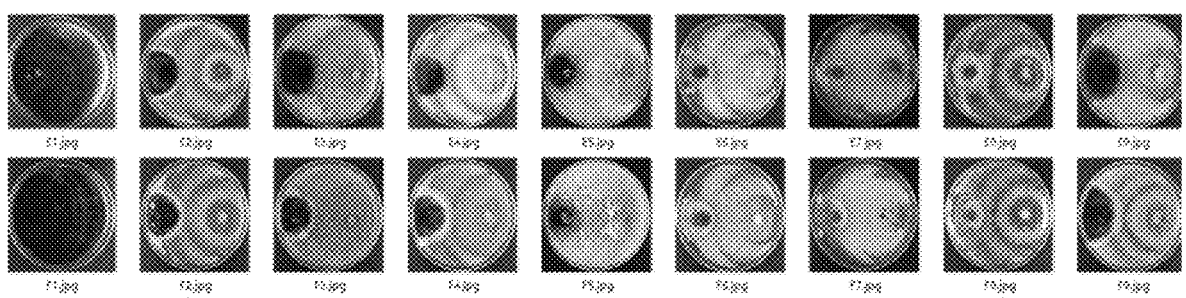
FIG. 6. Confrontation experiments of different *Trichoderma* strains to determine the ability of JF309 strains to inhibit pathogenic strain.

The results are shown in FIG. 6. It can be seen that the strain JF309 of the present invention has a more obvious effect on inhibiting the growth of *Alternaria* spp., compared to other *Trichoderma* strains. The original black pathogenic fungi were affected by *Trichoderma* and the mycelia became pale, with growth stopped.

3. Preparation of Liquid Metabolites of JF309 Strain (1) The potato flour was dissolved in purified water, heated to boiling state, and filtered with three layers of gauze. The filtrate was left for later use;

(2) Glucose was dissolved in the filtrate of (1), stirred and dissolved sufficiently. The culture medium was sterilized at high temperature, and left aseptically for later use;

(3) The *Trichoderma* strain was inoculated in a sterile environment at a 0.1% inoculation amount into the culture medium of (2), and cultured in a sterile environment at 25° C. with shaking at 150 rpm for 5 days, and the culture solution was removed for later use;

(4) First, the culture solution was filtered to remove visible impurities such as hyphae, then centrifuged at 5000 rpm for 5 min at room temperature. The supernatant was saved for later use.

Example 2. Preparation of *Trichoderma*-Derived Selenium Nanoparticles Foliar Fertilizer 1

In this embodiment, a *Trichoderma*-derived biological selenium nanoparticles foliar fertilizer 1 was prepared.

1. Preparation of Liquid Metabolites of JF309 Strain (1) Potato flour was dissolved in pure water, heated to a boiling state, filtered with three layers of gauze, and the filtrate was left for later use;

(2) Glucose was dissolved in the filtrate of (1), stirred and dissolved sufficiently. The culture medium was sterilized at high temperature, and left aseptically for later use;

(3) The *Trichoderma* strain was inoculated into the culture medium of (2) in a sterile environment, cultured at 25° C. with shaking at 150 rpm for 5 days in a sterile environment. The culture solution was removed for later use;

(4) First, the culture solution was filtered to remove visible impurities such as hyphae, then centrifuged at 5000 rpm for 5 min at room temperature. The supernatant was saved for later use.

2. Preparation of *Trichoderma*-Derived Selenium Nanoparticles Foliar Fertilizer (1) The supernatant obtained above was aliquoted into 1 L each, and 200 mg of sodium selenite powders were added, shaking at 100 rpm for 30 min at 25° C. to obtain a stable and uniform sodium selenite solution;

(2) The solution of (1) was slowly stirred; and 950 mg of ascorbic acid was added, stirred at 50 rpm for 1 h at 25° C. to obtain a stable and uniform selenium solution;

(3) The selenium solution was centrifuged at 10,000 rpm for 1 h at 4° C. The supernatant was recovered to prepare the culture, and the red precipitate was collected for later use;

(4) Freeze-drying the precipitate of (3) overnight to obtain a dry powdery *Trichoderma*-derived selenium nanoparticles fertilizer;

(5) Reconstituted with water and aliquoted at a concentration of 10 g/L to obtain a stock liquid of *Trichoderma*-derived selenium nanoparticles foliar fertilizer.

The *Trichoderma*-derived selenium nanoparticles foliar fertilizer stock liquid obtained above was converted into parts by weight, with the following raw materials: 1 part of sodium selenite (NaSeO₃), 4.75 parts of ascorbic acid, and 5000 parts of liquid metabolite of JF309 strain.

3. Molecular Size Determination of Foliar Fertilizer

The dry powdery *Trichoderma*-derived selenium nanoparticles fertilizer after freeze-drying process as mentioned above was obtained. 0.01 g was dissolved in 1 ml of double-distilled water for dyeing. 200 ul was taken and stained with 2% uranyl acetate aqueous solution for 15 min at room temperature. Lead citrate was added for staining for 10 min, and finally a small amount of sample was aspired onto a copper mesh for loading. Transmission electron microscope images of the selenium fertilizer particles in five fields were obtained. The particle size distribution was calculated by software calculation, the average value was obtained, and the particle size of the selenium fertilizer particles was determined.

Figure 5:
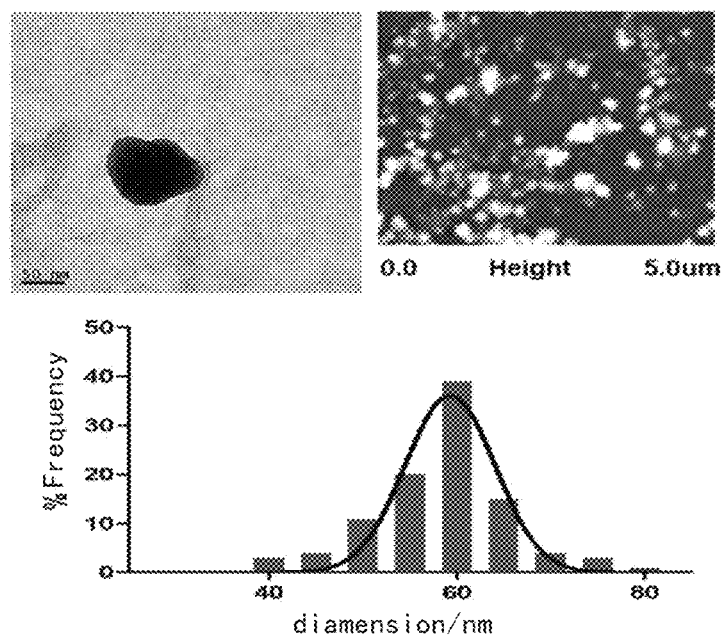
FIG. 5. Molecular size determination of selenium foliar fertilizer.

The results are shown in FIG. 5. The top two graphs showed the particle morphology (left) and the aggregated form (right) of the selenium fertilizer particles, and the bottom graph was the statistical distribution of the particle size distribution of the selenium fertilizer. It can be found that the particle size is concentrated in the range of 50-65 nm, which indicates that the *Trichoderma*-derived selenium fertilizer particles are nano-scale.

4. Research on the Compounds Present in the Foliar Fertilizer

The present inventors performed mass spectrometry analysis on the foliar fertilizer prepared as described above, and determined the compounds in the foliar fertilizer of the present invention. The results are shown in Table 1.

TABLE 1

| RT | Fold change | increase(+)/ decrease(−) | Compound | M/Z | Error/ ppm |
|---|---|---|---|---|---|
| 8.26 | 6.9 | + | Psoromic acid | 357.061 | 1 |
| 10.28 | 3.1 | + | p-Decyloxybenzoic acid | 277.180 | 2 |
| 6.22 | 2.6 | + | Glutaryl-CoA | 880.137 | 3 |
| 25.20 | 2.5 | + | 4-Pyridyldithio-carbamic acid | 168.990 | 0 |
| 9.18 | 2.4 | + | N-Undecanoylglycine | 242.175 | 3 |
| 17.42 | 2.1 | + | 4'-Decyloxybiphenyl-4-carboxylic Acid | 353.212 | 1 |
| 1.30 | 2.09 | − | Glucaric acid lactone | 191.019 | 3 |
| 5.37 | 1.95 | − | Lys Asp Tyr Glu Leu | 665.316 | 1 |
| 27.28 | 1.87 | − | 2-Hexyldecanoic acid | 255.233 | 0 |
| 14.23 | 1.8 | + | Apionic acid | 212.979 | 1 |
| 8.35 | 1.6 | + | Apigenin 7-xyloside | 401.087 | 1 |

According to Table 1, there are more antibacterial compounds and substances beneficial to plant growth in the foliar fertilizer prepared by the present invention.

Example 3. Inhibition Effect of the *Trichoderma*-Derived Selenium Nanoparticles Foliar Fertilizer 1

In this embodiment, the fruit and vegetable black spot pathogenic strain *Streptomyces* (*Alternaria alternata*, diseased frute from Jujube black spot disease), corn and other economic crop pathogenic strain (*Fusarium verticillioide*, kernels from corn ear rot), wheat rot pathogenic strain (*Fusarium graminearum*, ears from wheat rot disease) were cultured on potato dextrose agar medium (PDA) with different additives, and cultured at 25° C. for 7 days and 10 days, their growth were observed separately. The additives are 200 μg/ml traditional selenium nanoparticles (SNP) and 200 μg/ml *Trichoderma*-derived selenium nanoparticles foliar fertilizer 1 (referred to as TSNP) prepared in Example 1 of the present invention.

The above SNP preparation method was as follows: the sodium selenite powder was stabilized in an acacia gum stable solution, and an excessive amount of reducing agent such as ascorbic acid was added after half an hour, and after high speed centrifugation at 10,000 rpm for one hour, a dry weight nano selenium material was obtained, diluted to obtain the corresponding concentration of SNP (Synthesis and antioxidant properties of gum arabic-stabilized selenium nanoparticles., Int J Biol Macromol. 2014 April; 65: 155-62).

After 7 days of culture, the growth of fruit and vegetable black spot pathogens *Alternaria* (left), corn and other economic crop pathogens *Fusarium verticillioide* (middle), wheat rot pathogens and *Fusarium graminearum* (right) were shown in FIG. 1a-1c, wherein, (a) was a control group and cultured in PDA medium only; (b) was cultured with 200 μg/ml SNP in PDA medium; (c) was cultured with 200 μg/ml TSNP in PDA medium. It can be seen that, compared with the control group, the growth state of the fungus exhibited extremely significant inhibition after adding the foliar fertilizer of the present invention; and the addition of SNP had partial inhibition, but the inhibitory effect was not satisfactory.

After 10 days of culture, the strains were assayed by scanning electron microscopy. The scanning electron micrographic image of the mycelium in the control group after 10 days of culture was shown in FIG. 1e, and the mycelium was normal. However, after 10 days of culture in TSNP group, the normal mycelia was distorted and deformed, as shown in FIG. 1f.

Therefore, the inhibitory effect of the *Trichoderma*-derived selenium nanoparticles (TSNP) of the present invention on the mycelium was significantly better than that of the traditional selenium nanoparticles.

Example 4. Effect of *Trichoderma*-Derived Selenium Nanoparticles Foliar Fertilizer 1 on Mycotoxin Biosynthesis Factors and Toxicity In this embodiment, *Alternaria alternata* and *Fusarium verticillioide* were cultured. The nucleic acids were extracted, and the effect of the foliar fertilizer of the present invention on the mycotoxin biosynthetic factors was detected. This assay included three groups: CK group (blank control group, liquid PDB medium), SNP group (cultured in PDB medium with traditional SNP), and TSNP group (cultured in PDB medium with TSNP).

The biosynthetic factors identified included fumonisin synthesizing gene, FUM1, and synthesizing gene of *Alternaria* toxins, PA. Gene expression was detected by quantative PCR.

The primers used to determine FUM1 were: GAGTG-TATGCAGTCATCAGG and GCCCGAGTCGTATAAGTC (SEQ ID NO: 1);

The primers used to determine PA were: GTGAC-CTACGCCGATAACT and AAGCATTGACGATGAAACC (SEQ ID NO: 2);

The primers used to determine FUM19 were: ATCAG-CATCGGTAACGCTTATGA and CGCTTGAAGAGCTC-CTGGAT (SEQ ID NO: 3);

The primers used to determine EPG were: TGCCTGC-GAACAAGATGC and CCGTTCTGGAAAGTAATGCC (SEQ ID NO: 4).

Figure 2:
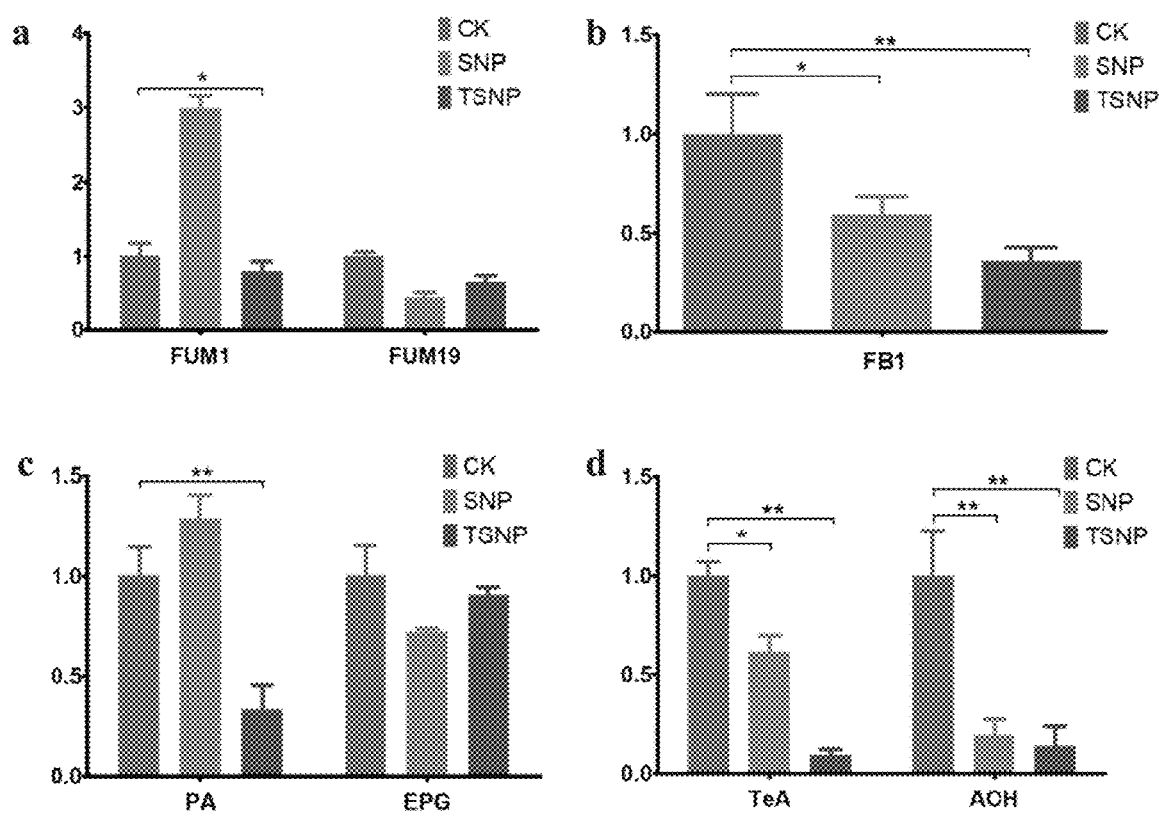
FIG. 2. After TSNP treatment, the expression of biosynthetic gens for mycotoxins was down-regulated; using the expression in the CK group as 1, the other groups were compared with it to obtain relative values (ordinate);
(a) Down-regulation of the expression levels of fumonisin synthesizing gene, FUM1;
(b) LC-MS/MS results showed a significant reduction in fumonisin production;
(c) significant down-regulation of the expression levels of synthesizing gene of *Alternaria* toxins, PA;
(d) LC-MS/MS results showed a significant reduction in the production of TeA and AOH.

The genetic assay results were shown in FIGS. 2a and 2c. It can be seen that in the TSNP group, the expression of the fumonisin synthesizing gene FUM1 was down-regulated, and the expression of synthesizing gene of *Alternaria* toxins PA was significantly reduced.

The inventors also used LC-MS/MS to detect toxins, and the results were shown in FIGS. 2b and 2d, indicating that the production of Fumonisin (FB) was significantly reduced, and the production of two types of *Alternaria* toxins (AOH and TeA) was significantly reduced.

Example 5. Improvement Effect of *Trichoderma*-Derived Selenium Nanoparticles Foliar Fertilizer 1 on Plant Disease Resistance In this embodiment, the improvement effect of *Trichoderma*-derived selenium nanoparticles foliar fertilizer 1 on plant disease resistance was assayed.

1. Corn Kernels as Study Objects

Corn kernels were obtained and subjected to different treatments, soaked in a culture solution (PDB liquid medium) containing *Fusarium verticillioide* (0.1% spore fluid), at 25° C. for 5 days. The different treatments include: soaked with sterile water (i), untreated before soaked with pathogen (ii), kernels were soaked with SNPs before incubating with pathogen (iii), kernels were soaked with TSNPs before incubating with pathogen (iv).

Figure 3:
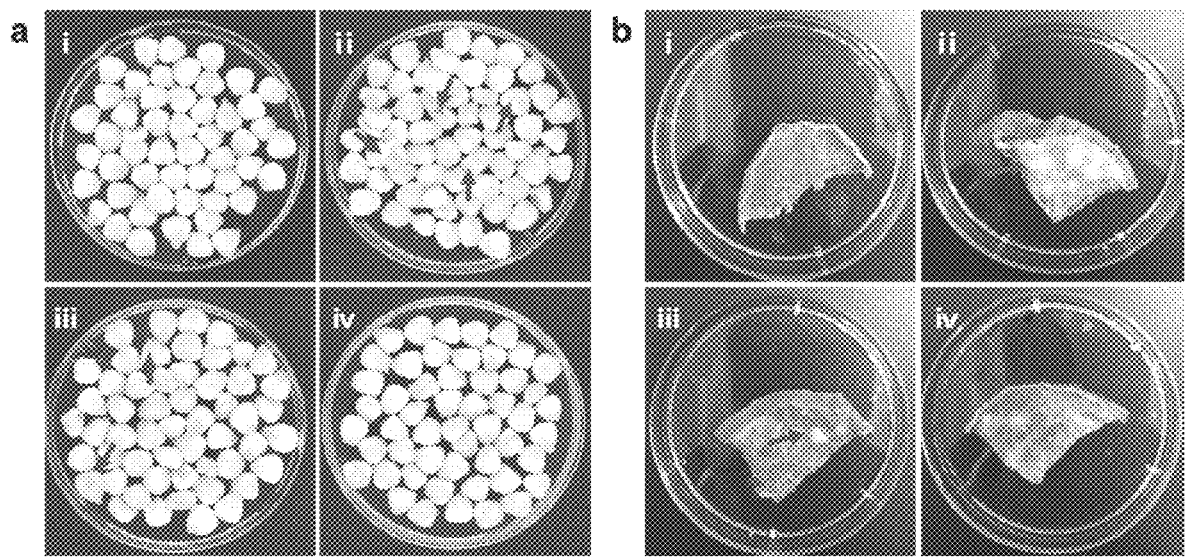
FIG. 3. TSNP has a better effect on the incidence of corn and pear inoculated with pathogenic strain;
(a) Corn kernels were soaked in a culture solution containing *Fusarium beadium*, then incubated in 25° C. for 5 days after different treatments. Kernels soaked in sterile water (i), left untreated before soaking (ii), coated with traditional selenium nanoparticles before soaking (iii), and coated with TSNP before soaking (iv).
(b) *Alternaria albicans* was puncture inoculated on the surface of pear slices, then incubated in 25° C. for 5 days after different treatments. Pear pulp were soaked in sterile water (i); without treatment (ii); traditional selenium nanoparticles (iii), and (iv) TSNP.

The results were shown in FIG. 3a. It can be seen that the application of TSNP before incubating with pathogen can significantly improve the disease resistance of corn kernels. The state of the kernels is close to group (i) that is not soaked with pathogen, and the group with SNP (iii) or the untreated group (ii) have more fungal growth on the surface of the kernels (red arrows indicate some representative fungal enriched areas).

2. Pear as Study Object

Slices of the pear were obtained, subjected to different treatments, and puncture-inoculated with *Alternaria*, incubated at 25° C. for 5 days. The different treatments include: soaked with sterile water (i), untreated before soaked with pathogen (ii), soaked with SNPs before incubating with pathogen (iii), soaked with TSNPs before incubating with pathogen (iv).

The results were shown in FIG. 3b. It can be seen that the application of TSNP before incubating with pathogen can significantly improve the disease resistance of pear pulp slices. The fungal growth after incubating with pathogen was significantly less than that in the group with SNP (iii) or the untreated group (ii). (Red arrows indicate some representative areas of fungal enrichment).

In summary, TSNP has a better effect on the incidence of corn and pear inoculated with pathogenic strains.

3. Comparison of Antibacterial Ability for Different *Trichoderma* Strains

The inventors replaced JF309 with different types of *Trichoderma* stains (FIG. 4), and fermented to obtain the fermentation supernatant. Then, the corresponding *Trichoderma*-derived selenium nanoparticles foliar fertilizer were synthesized as described in the above Example 2. The effects of metabolites from different *Trichoderma* strains as foliar fertilizer were assayed.

The pathogenic bacteria *Fusarium verticillioide* (top) and *Alternaria alternata* (bottom) were cultured on PDA. After the pathogens were activated, they were inoculated into PDA plates comprising the *Trichoderma*-derived selenium nanoparticles foliar fertilizer synthesized as above and the inhibitory effect on pathogens were observed. The antibacterial effect was desirable if the pathogen was significantly reduced.

Figure 4:
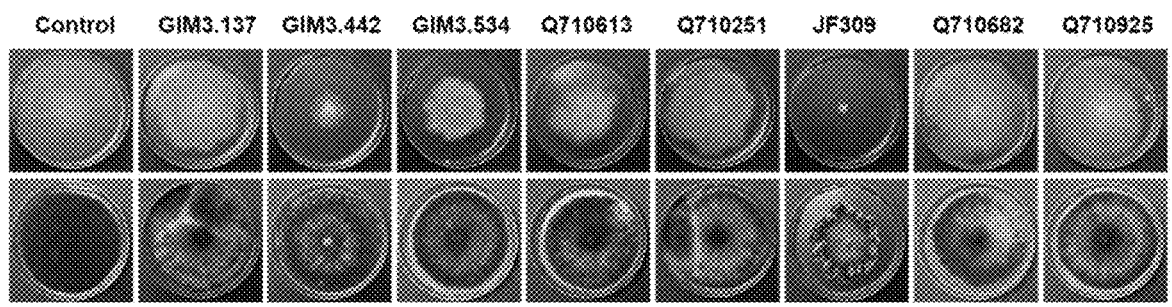
FIG. 4. Comparison of the antibacterial ability of *Trichoderma*-derived selenium fertilizer synthesized by different *Trichoderma* strains.

The results were shown in FIG. 4. It was obvious that the *Trichoderma*-derived selenium nanoparticles foliar fertilizer prepared based on the metabolites of JF309 has the best inhibitory effect.

Example 6. Preparation of *Trichoderma*-Derived Selenium Nanoparticles Foliar Fertilizers 2 and 3

In this embodiment, a *Trichoderma*-derived biological selenium nanoparticles foliar fertilizer 2 is prepared.

1. Preparation of Liquid Metabolites of JF309 Strain (1) The potato flour was dissolved in purified water, heated to boiling state, and filtered with three layers of gauze. The filtrate was left for later use;

(2) Glucose was dissolved in the filtrate of (1), stirred and dissolved sufficiently. The culture medium was sterilized at high temperature, and left aseptically for later use;

(3) The *Trichoderma* strain was inoculated in the culture medium of (2) in a sterile environment, incubated at 25.5° C. with shaking at 140 rpm for 6 days in a sterile environment, and the culture liquid was removed for later use;

(4) First, the culture solution was filtered to remove visible impurities such as hyphae, then centrifuged at 5000 rpm for 5 min at room temperature. The supernatant was saved for later use. The main active substance of the supernatant is the strain metabolite.

2. Preparation of *Trichoderma*-Derived Biological Selenium Nanoparticles Foliar Fertilizer 2

(1) The supernatant obtained in the above "1" was aliquoted into 1 L portions, 280 mg of sodium selenite powder was added, shaken at 25.5° C., 95 rpm for 25 min to obtain a stable and uniform sodium selenite solution;

(2) The solution in (1) was slowly stirred, adding 700 mg of sodium citrate, and stirred at 25° C. and 50 rpm for 1 h to obtain a stable and uniform selenium solution;

(3) The selenium solution was centrifuged at 10,000 rpm and 4° C. for 1 h. The supernatant was recovered to prepare the culture medium, and the red precipitate was collected for later use;

(4) The precipitate in (3) was frozen-dried overnight to obtain a dry powdery *Trichoderma*-derived selenium nanoparticles fertilizer;

(5) Reconstituted with water and aliquoted at a concentration of 10 g/L to obtain a mother liquid of selenium nanoparticles foliar fertilizer derived from *Trichoderma*.

The mother liquid of the *Trichoderma*-derived selenium nanoparticles foliar fertilizer obtained above is converted into parts by weight, and the raw materials are: 1.4 parts of sodium selenite (NaSeO$_3$), 3.5 parts of ascorbic acid, and 5000 parts of liquid metabolite of JF309 strain.

3. Preparation of *Trichoderma*-Derived Biological Selenium Nanoparticles Foliar Fertilizer 3

(1) The supernatant obtained in the above "1" was aliquoted into 1 L each, 240 mg of sodium selenite powder was added, shaking at 105 rpm for 25 min at 25.5° C., to obtain a stable and uniform sodium selenite solution;

(2) The solution in (1) was slowly stirred; 800 mg of ascorbic acid was added, stirred 50 rpm for 1 h at 25° C., to obtain a stable and uniform selenium solution;

(3) The selenium solution was centrifuged at 10,000 rpm for 1 h at 4° C. The supernatant was recovered to prepare the culture, and the red precipitate was collected for later use;

(4) Freeze-drying the precipitate in (3) overnight to obtain a dry powdery *Trichoderma*-derived selenium nanoparticles fertilizer;

(5) Reconstituted with water and aliquoted at a concentration of 10 g/L to obtain a stock liquid of *Trichoderma*-derived selenium nanoparticles foliar fertilizer.

The stock liquid of the *Trichoderma*-derived selenium nanoparticles foliar fertilizer obtained above was converted into parts by weight, and the raw materials were: 1.2 parts of sodium selenite (NaSeO$_3$), 4 parts of ascorbic acid, and 5000 parts of liquid metabolite of JF309 strain.

Under laboratory conditions, the tests were performed on the *Trichoderma*-derived selenium nanoparticles foliar fertilizer 2 and the *Trichoderma*-derived selenium nanoparticles foliar fertilizer 3, and the experimental method was the same as in Example 5. The results showed that selenium nanoparticles foliar fertilizer 2 and *Trichoderma*-derived biological selenium nanoparticles foliar fertilizer 3 had significant and good effects on improving the incidence of corn and pear inoculated with pathogens.

Preservation of Biological Materials

The JF309 strain (*Trichoderma* spp.) provided by the present invention is deposited at the China Type Culture Collection (CCTCC, Wuhan, Wuhan University, China), the deposit number is CCTCC NO: M 2019066, with the deposit date of Jan. 21, 2019.

The above description is a detailed description of the preferred and feasible embodiments of the present invention, but the embodiments are not intended to limit the scope of the patent application of the present invention. All equivalent products or modifications made under the technical means suggested by the present invention shall belong to the scope of patents covered by the present invention.

We claim:

1. An agriculture composition prepared by a method comprising the step of: mixing a *Trichoderma harzianum* culture with selenite; wherein the *Trichoderma harzianum* culture is the liquid *Trichoderma* metabolites isolated from the culture after the fermentation of *Trichoderma harzianum* or the supernatant isolated from the culture after the fermentation of *Trichoderma harzianum*; wherein the *Trichoderma harzianum* is the JF309 strain deposited with the China Center for Type Culture Collection as Deposit Accession No. CCTCC M 2019066.

2. The composition according to claim 1, wherein the selenite comprises: sodium selenite, potassium selenite or zinc selenite.

3. The composition according to claim 2, wherein the fermentation medium comprises potato flour and glucose.

4. The composition according to claim 3, wherein the medium comprises: 10-22 parts by weight of potato flour, 1-2.2 parts by weight of glucose, 0.0015-0.004 parts by weight of selenite, 0.004-0.015 parts by weight of ascorbic acid, 0.0001 parts by weight of *Trichoderma harzianum*, and the balance of water.

5. The composition according to claim 4, wherein the fermentation process comprises:
  (a) dissolving the potato flour in water, heating to boil, and filtering to obtain the filtrate;
  (b) dissolving glucose in the filtrate of step (a), mixing and sterilizing to obtain a culture medium;
  (c) inoculating *Trichoderma harzianum* strain in the culture medium of (b), with shaking at room temperature for 5±3 days to obtain a culture solution; and
  (d) filtering and centrifuging the culture solution of (c) to obtain a supernatant.

6. The composition according to claim 1, further comprising: adding a reducing agent in the mixture after the *Trichoderma harzianum* culture is mixed with selenite; and centrifuging to obtain a precipitate.

7. The composition according to claim 6, wherein the reducing agent comprises: ascorbic acid or sodium citrate.

8. The composition according to claim 1, wherein the composition is an agrochemical composition comprising the reaction product of the *Trichoderma harzianum* culture and the selenite as the main active components.

9. The composition according to claim 8, wherein the composition is an agrochemical composition comprising the reaction product of the *Trichoderma harzianum* culture, the selenite and the reducing agent.

10. A method for the preparation of fertilizers for reducing crop fungal diseases and toxin contamination comprising: mixing the composition according to-claim 1 with an agriculturally acceptable carrier.

11. The method according to claim 10, wherein the fungal diseases are the diseases caused by *Alternaria alternata, Fusarium verticillioide, Fusarium graminearum, Alternaria alternata, Fusarium verticillioide*.

12. A *Trichoderma*-derived selenium nanoparticles foliar fertilizer, comprising the composition according to claim 1 and an agriculturally acceptable carrier.

13. A method for preparing an agriculture composition, comprising:
  (1) fermenting *Trichoderma harzianum* to obtain a *Trichoderma harzianum* culture, isolating the liquid

*Trichoderma* metabolites or the supernatant from the culture after the fermentation of *Trichoderma harzianum*; wherein the *Trichoderma harzianum* is the JF309 strain deposited with the China Center for Type Culture Collection as Deposit Accession No. CCTCC M 2019066; and (2) mixing selenite with the *Trichoderma harzianum* culture from (1).

14. The method according to claim 13, wherein the selenite comprises: sodium selenite, potassium selenite, or zinc selenite.

15. The method according to claim 13, wherein the fermentation medium comprises potato flour and glucose.

16. The method according to claim 15, wherein the medium comprises: 10-22 parts by weight of potato flour, 1-2.2 parts by weight of glucose, 0.0015-0.004 parts by weight of selenite, 0.004-0.015 parts by weight of ascorbic acid, 0.0001 parts by weight of *Trichoderma harzianum*, and 75-85 parts by weight of water.

17. The method according to claim 15, wherein the fermentation process comprises:
(a) dissolving the potato flour in water, heating to boil, and filtering to obtain the filtrate;
(b) dissolving glucose in the filtrate of step (a), mixing and sterilizing to obtain a culture medium;
(c) inoculating *Trichoderma harzianum* strain in the culture medium of (b), with shaking at room temperature for 5±3 days to obtain a culture solution; and
(d) filtering and centrifuging the culture solution of (c) to obtain a supernatant.

18. The method according to claim 13, further comprising: adding a reducing agent in the mixture after the *Trichoderma harzianum* culture is mixed with selenite; and centrifuging to obtain a precipitate.

19. The method according to claim 18, wherein the reducing agent comprises: ascorbic acid or sodium citrate.

* * * * *

SEQUENCE LISTING

```
<160> NUMBER OF SEQ ID NOS: 8

<210> SEQ ID NO 1
<211> LENGTH: 20
<212> TYPE: DNA
<213> ORGANISM: Artificial
<220> FEATURE:
<223> OTHER INFORMATION: oligonucleotide

<400> SEQUENCE: 1
gagtgtatgc agtcatcagg                                                 20

<210> SEQ ID NO 2
<211> LENGTH: 18
<212> TYPE: DNA
<213> ORGANISM: Artificial
<220> FEATURE:
<223> OTHER INFORMATION: oligonucleotide

<400> SEQUENCE: 2
gcccgagtcg tataagtc                                                   18

<210> SEQ ID NO 3
<211> LENGTH: 19
<212> TYPE: DNA
<213> ORGANISM: Artificial
<220> FEATURE:
<223> OTHER INFORMATION: oligonucleotide

<400> SEQUENCE: 3
gtgacctacg ccgataact                                                  19

<210> SEQ ID NO 4
<211> LENGTH: 19
<212> TYPE: DNA
<213> ORGANISM: Artificial
<220> FEATURE:
<223> OTHER INFORMATION: oligonucleotide

<400> SEQUENCE: 4
aagcattgac gatgaaacc                                                  19

<210> SEQ ID NO 5
<211> LENGTH: 23
<212> TYPE: DNA
<213> ORGANISM: Artificial
<220> FEATURE:
<223> OTHER INFORMATION: oligonucleotide
```

```
<400> SEQUENCE: 5
atcagcatcg gtaacgctta tga                                               23

<210> SEQ ID NO 6
<211> LENGTH: 20
<212> TYPE: DNA
<213> ORGANISM: Artificial
<220> FEATURE:
<223> OTHER INFORMATION: oligonucleotide

<400> SEQUENCE: 6
cgcttgaaga gctcctggat                                                   20

<210> SEQ ID NO 7
<211> LENGTH: 18
<212> TYPE: DNA
<213> ORGANISM: Artificial
<220> FEATURE:
<223> OTHER INFORMATION: oligonucleotide

<400> SEQUENCE: 7
tgcctgcgaa caagatgc                                                     18

<210> SEQ ID NO 8
<211> LENGTH: 20
<212> TYPE: DNA
<213> ORGANISM: Artificial
<220> FEATURE:
<223> OTHER INFORMATION: oligonucleotide

<400> SEQUENCE: 8
ccgttctgga aagtaatgcc                                                   20
```